(12) United States Patent
Ohishi

(10) Patent No.: US 10,542,129 B2
(45) Date of Patent: Jan. 21, 2020

(54) WIRELESS COMMUNICATION DEVICE

(71) Applicant: Kabushiki Kaisha Toshiba, Tokyo (JP)

(72) Inventor: Takafumi Ohishi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/915,118

(22) Filed: Mar. 8, 2018

(65) Prior Publication Data

US 2019/0141173 A1    May 9, 2019

(30) Foreign Application Priority Data

Nov. 9, 2017    (JP) .................................. 2017-216655

(51) Int. Cl.

| | | |
|---|---|---|
| *H02M 1/02* | (2006.01) | |
| *H04M 1/02* | (2006.01) | |
| *H01Q 5/385* | (2015.01) | |
| *H01Q 9/04* | (2006.01) | |
| *H01Q 19/00* | (2006.01) | |
| *H04W 84/18* | (2009.01) | |

(52) U.S. Cl.
CPC .......... *H04M 1/0277* (2013.01); *H01Q 5/385* (2015.01); *H01Q 9/0407* (2013.01); *H01Q 19/005* (2013.01); *H04M 1/0262* (2013.01); *H04M 1/0274* (2013.01); *H04W 84/18* (2013.01)

(58) Field of Classification Search
CPC ............. H04M 1/0277; H04M 1/0274; H04M 1/0262; H04W 84/18; H01Q 19/005; H01Q 9/0407; H01Q 5/385
USPC ........................................................ 455/573
See application file for complete search history.

(56) References Cited

U.S. PATENT DOCUMENTS

| | | | | |
|---|---|---|---|---|
| 2013/0307636 A1* | 11/2013 | Kimbara | .................. | H03H 9/46 333/133 |
| 2018/0062275 A1* | 3/2018 | Kim | ..................... | G06Q 20/327 |

FOREIGN PATENT DOCUMENTS

WO    WO 2009/057214 A1    5/2009

* cited by examiner

*Primary Examiner* — Eugene Yun
(74) *Attorney, Agent, or Firm* — Finnegan, Henderson, Farabow, Garrett & Dunner, L.L.P.

(57) ABSTRACT

According to one embodiment, a wireless communication device includes a first surface, a power storage unit, an antenna board, a circuit board, a wireless communication unit and a signal line. The power storage unit has a second surface located oppositely to the first surface. The antenna board implemented with an antenna faces the first surface. The circuit board faces the second surface of the power storage unit. The wireless communication unit is implemented to the circuit board and is located oppositely to a surface facing the power storage. The signal line connects the antenna board and the wireless communication unit.

16 Claims, 13 Drawing Sheets

WIRELESS COMMUNICATION DEVICE

CROSS-REFERENCE TO RELATED APPLICATIONS

This application is based upon and claims the benefit of priority from Japanese Patent Application No. 2017-216655, filed on Nov. 9, 2017; the entire contents of which are hereby incorporated by reference.

FIELD

Embodiments described herein relate generally to a wireless communication device.

BACKGROUND

Recently, devices that send data collected from sensors by using wireless communication are being developed. Such devices are used for collecting measured data for applications in automotive systems, industrial systems, IoT systems, healthcare systems or the like. The devices need to store a sensor, a battery, an antenna, a wireless communication circuit or the like in a compact body, while maintaining high communication performance and high serviceability.

Since the antennas are located closely to the sensors and communication circuits in these devices, degraded communication performance and fluctuating frequency responses become problems. Depending on the type of sensors and location of circuits, different patterns of electromagnetic coupling and interference may occur. Therefore, it is difficult to find a general solution for the problems. Even though the design changes made to the circuit are small, the whole antenna needs to be redesigned.

DETAILED DESCRIPTION

According to one embodiment, a wireless communication device includes a first surface, a power storage unit, an antenna board, a circuit board, a wireless communication unit and a signal line. The power storage unit has a second surface located oppositely to the first surface. The antenna board implemented with an antenna faces the first surface. The circuit board faces the second surface of the power storage unit. The wireless communication unit is implemented to the circuit board and is located oppositely to a surface facing the power storage. The signal line connects the antenna board and the wireless communication unit.

Hereinafter, embodiments of the present invention will be described with reference to the drawings.

First Embodiment

Figure 1:
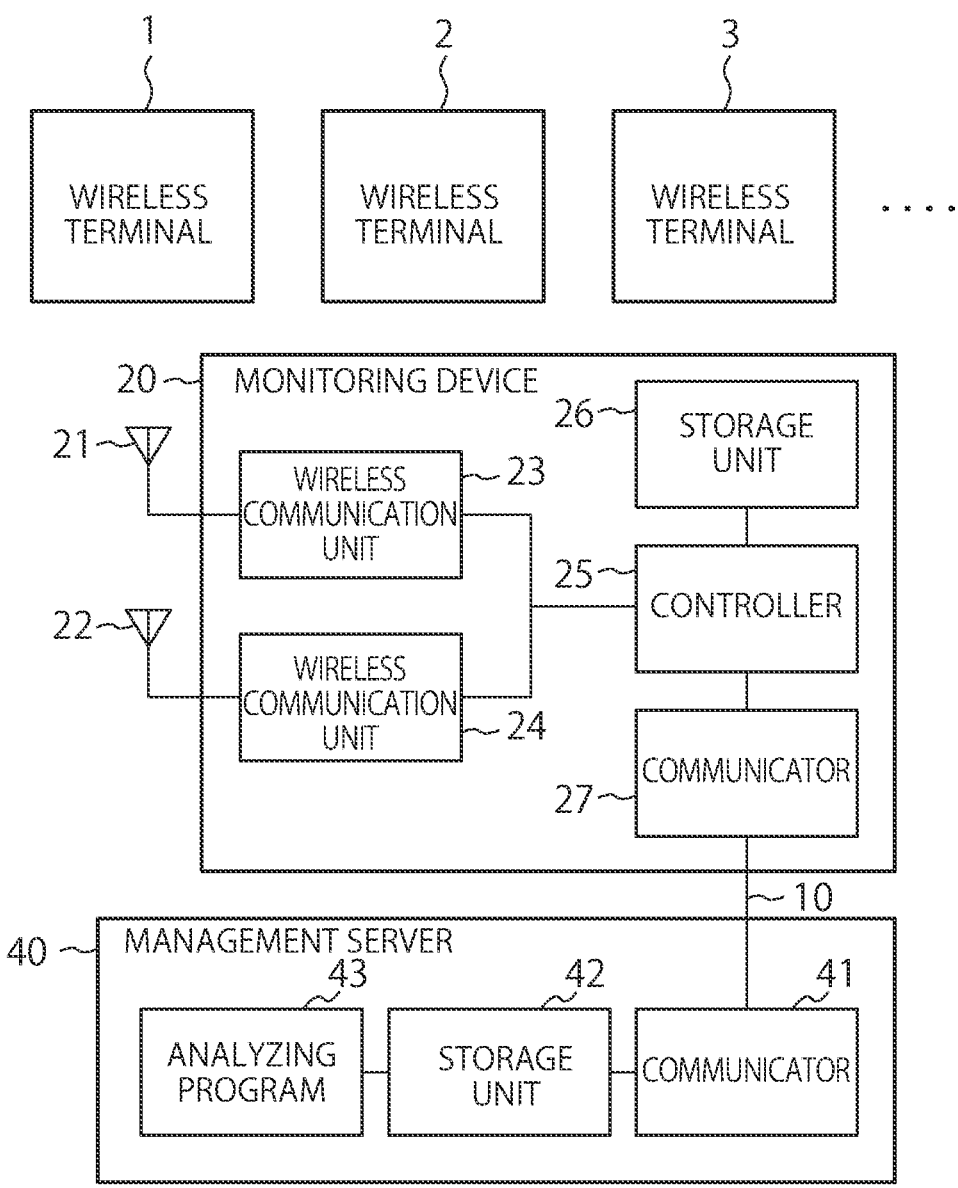
FIG. 1 is a diagram showing components of the system according to a first embodiment.

FIG. 1 is a block diagram showing a schematic configuration of a system according to a first embodiment. A system according to a first embodiment will be described with reference to FIG. 1.

A wireless communication system according to FIG. 1 includes wireless terminals 1-3, a monitoring device 20 and a management server 40. Here, wireless terminals 1-3 are wireless communication devices according to the embodiment. The monitoring device 20 and the management server 40 are connected via a network 10. The network 10 could be any type of electric media which is capable of transmitting data. Any type of interface can be used for the network 10. Although three wireless terminals are shown in FIG. 1, a greater number of wireless terminals could be installed. Thus, the number of wireless terminals is not limited. Although only one management server is shown in FIG. 1, it is possible to install a plurality of management servers for the sake of load balancing and improved availabilities.

The wireless terminals 1-3 are wireless communication devices with an antenna, a battery, a sensor and a wireless communication circuit implemented integrally in a single body. It is possible to use a capacitor as a source of power, instead of a battery. In below, the batteries and the capacitors are referred to as electric storage units.

In the following description, wireless terminals with sensors are explained. However, the wireless communication device according to the embodiment of the invention does not necessary need to have a sensor. For example, it is possible to implement a circuit for relaying signals in the wireless communication device. In this way, it is possible to relay wireless signals.

Examples of the wireless communication methods used by the wireless terminals 1-3 could be wireless LAN including IEEE 802.11 series and their successor standards. Also, Bluetooth, ZigBee and other communication methods may be used. The wireless terminals 1-3 can communicate with external wireless communication devices such as the monitoring device 20 by using wireless communication. For example, the wireless terminals 1-3 transmit data measured by the sensors to the monitoring device 20. The monitoring device sends various instructions to the wireless terminal 1, for example. Details on the wireless terminals 1-3 are mentioned later.

The monitoring device 20 is a wireless communication device which can handle wireless communication in multiple frequency ranges. Examples of the wireless communication methods used by the monitoring device 20 could be wireless LAN including IEEE 802.11 series and their successor standards. Also, Bluetooth, ZigBee and other communication methods may be used. However, the communication method used by the monitoring device 20 needs to be the same or compatible as the wireless communication methods used by the wireless terminals 1-3. The monitoring device 20 can receive the data measured by the sensors from the wireless terminals 1-3. Then, the monitoring device 20 can transmit the data to the management server 40.

Here, a case where a single wireless communication device (the monitoring device 20) communicates using multiple frequency ranges is explained. However, a plurality of wireless communication devices which communicate using different frequency ranges could receive the data measured by the sensors from the wireless terminals 1-3.

The management server 40 is an information processing device such as a computer which includes one or more CPUs (Central Processing Units), a storage device and a communicator. An OS (Operating System) and an application operate on the management server 40. The management server 40 gathers data measured by the sensors and analyzes the measured data.

The features of the management server 40 could be implemented using different methods. For example, the management server 40 could be implemented with a physical computer, a virtual machine, a container or a combination of these. It is possible to allocate the features of the management server 40 to a plurality of computers. Also, the location of the management server 40 is not limited to specific locations. The features of the management server 40 could be implemented in the monitoring device 20. Also, it is possible to install the management server 40 in a site which is remote from the monitoring device 20.

Next, the components of the monitoring device 20 and the management server 40 are explained.

The monitoring device 20 includes antennas 21 and 22, wireless communication units 23 and 24, a controller 25, a storage unit 26 and a communicator 27.

The wireless communication units 23 and 24 provide wireless communication functions. The wireless communication units 23 and 24 are wireless modules such as wireless LAN modules, Bluetooth modules, ZigBee modules or the like. The wireless communication units 23 and 24 could be the same type of modules or different types of modules. Regardless of the communication methods, the wireless communication units 23 and 24 use different frequency ranges. The wireless communication units 23 and 24 are electrically connected to the antennas 21 and 21, respectively. Wireless signals are received and transmitted via the antennas 21 and 21. The antennas 21 and 21 can be implemented in the wireless modules. The antennas 21 and 21 can be also attached to the wireless modules externally.

The controller 25 controls the data transmission and data receiving processes. For example, the controller 25 can specify the destination devices or the target devices of the wireless communication units 23 and 24. The controller 25 can also save the received data to the storage unit 26 temporarily. The controller 25 can also read out the data to be transmitted from the storage unit 26. The controller 25 can also update the configurations of the wireless communication units 23 and 24. The controller 25 can also specify physical information (sensor) that is measured in the wireless terminals 1-3 and the timing of measurement.

The features of the controller 25 could be implemented with software (programs) that operate on processors such as the CPU (Central Processing Unit). It is possible to implement the features using hardware circuitry such as FPGAs, ASICs or the like. It is also possible to implement the features by using a combination of the above.

The storage unit 26 provides storage space where various data could be stored. The storage unit 26 can be configured with non-volatile storage devices such as NAND flash memory, NOR flash memory, MRAM, ReRAM, hard disks, optical discs. The storage unit 26 can be also configured with volatile storage devices such as DRAM or a combination of the above.

The communicator 27 enables the transmission and reception of data signals. Examples of interfaces used by the communicator 27 include wired Ethernet (IEEE 802.3 series), wireless LAN, PCI Express, USB, UART, SPI, SDIO or the like. However interfaces according to other standards can be used. The communicator 27 is connected to the management server 40 via the network 10.

The management server 40 includes a communicator 41, a storage unit 42 and an analyzing program 43.

The communicator 41 enables the transmission and reception of data signals. Examples of interfaces used by the communicator 41 include wired Ethernet (IEEE 802.3 series), wireless LAN, PCI Express, USB, UART, SPI, SDIO or the like. Interfaces according to other standards can be used. However, the communicator 41 needs to use the same or compatible interface as the interface used by the communicator 41 of the monitoring device 41. The communicator 41 is connected to the communicator 27 of the management server 40 via the network 10.

The storage unit 42 provides storage space where various data such as the data measured by the wireless terminals 1-3 and the analyzing program 43 could be saved. The storage unit 42 can be configured with non-volatile storage devices such as NAND flash memory, NOR flash memory, MRAM, ReRAM, hard disks, optical discs. The storage unit 42 can be also configured with volatile storage devices such as DRAM or a combination of the above.

The analyzing program 43 is a program which extracts information of the monitored target by using the measured data from sensors stored in the storage unit 42. The information extracted by the analyzing program 43 could be changes of states, detection of anomalies, for example. The analyzing program 43 can execute the analyzing process after editing the measured data. The analyzing program 43 could execute a different task based on the results and extracted information.

For example, if the sensors of the wireless terminals 1-3 are collecting biometric information such as the body temperature, the blood pressure, the pulse or the like, the analyzing program 43 could analyze the health conditions and exercising conditions. For example, if it is determined that the condition of health is deteriorating severely, it is possible to notify alerts to the supervisors or medical institutions.

If the wireless terminals 1-3 are implemented in a remote controller of home appliances, it is possible to obtain information on the room temperature and brightness. For example, if the wireless terminals 1-3 are implemented in remote controllers of air conditioning equipment, it is possible to adjust the cooling operation or the heating operation based on the room temperature. If the wireless terminals 1-3 are implemented in remote controllers of televisions, it is possible to adjust the brightness and color of the screen based on the illumination of the room.

The wireless terminals 1-3 can be implemented in machinery systems such as factories or automobiles. In this case, the sensors measure the temperature, the pressure, the number of rotations, the concentration of substances, the speed, the acceleration rate or the like. There could be a plurality of targets for measurement. The analyzing program 43 can detect anomalies of the monitored target or detect changes of states based on the measured data. Anomaly detection could be executed based on physical models or machine learning. If anomalies or changes in states are detected, it is possible to switch the operation mode. It is also possible to halt the operation of all or some of the equipments.

Next, the wireless terminal which is the wireless communication device according to the embodiment is explained.

Figure 2:
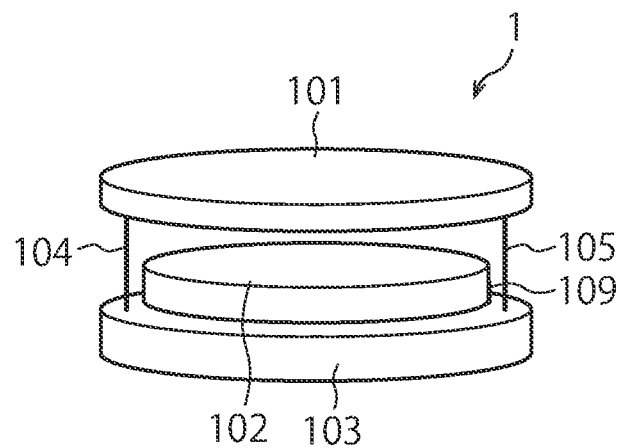
FIG. 2 is a diagram showing a perspective view of a wireless communication device according to the first embodiment.
Figure 3:
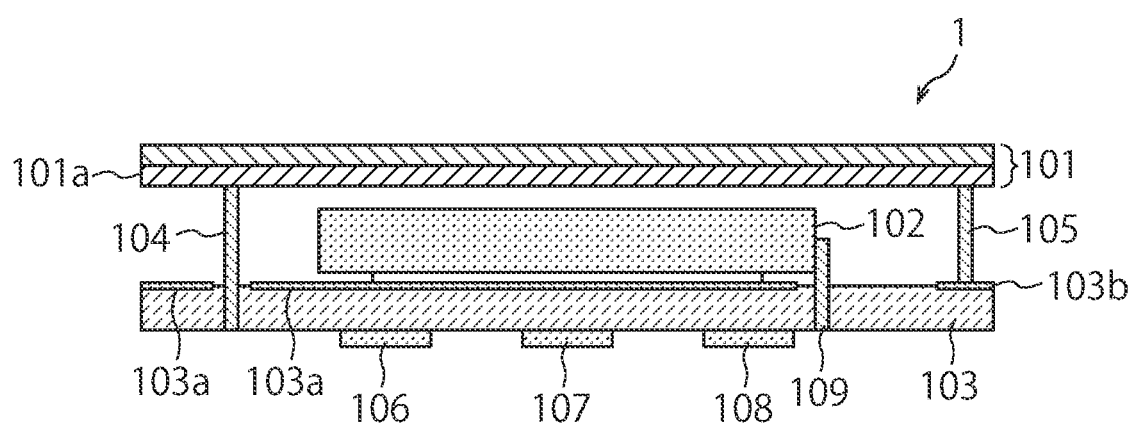
FIG. 3 is a cross-sectional diagram of the wireless communication device according to the first embodiment.

FIG. 2 is a cross-sectional diagram of the wireless communication device according to the first embodiment. FIG. 3 is a cross-sectional diagram of the wireless communication device according to the first embodiment. Below, the wireless terminal is explained in reference to FIG. 2 and FIG. 3.

The wireless terminal 1 includes an antenna board 101, a battery 102, a circuit board 103, a signal line 104, a ground line 105 and a power line 109. The antenna board 101 is located in the top of the body. The circuit board 103 is located in the bottom of the body. The battery 102 is implemented between the antenna board 101 and the circuit board 103. The antenna board 101 and the circuit board 103 are connected to each other by the signal line 104 and the ground line 105.

The body of the wireless device according to the embodiment is in substantially cylindrical form. However, the shape of the body could be different. For example, the body of the wireless terminal could be in substantially rectangular parallelepiped forms or in substantially spheroidal forms.

An antenna 101a for wireless communication is implemented in the antenna board 101. Details on the antenna 101a are mentioned later. The signal line 104 and the ground line 105 come out from the bottom of the antenna board 101.

The battery 102 is a button cell battery which is in substantially cylindrical form, for example. The battery 102 is an example of an electric storage unit. The electric storage unit (battery) has a first surface and a second surface in the opposite side. The top surface (first surface) and the side surface of the battery 102 correspond to the positive electrode (plus side). The bottom surface (second surface) of the battery 102 corresponds to the negative electrode (minus side). The battery 102 could be either a primary battery or a secondary battery. Types of batteries include alkaline batteries, lithium batteries, nickel-metal hydride batteries but any type of battery could be used. Here, a button cell battery is only an example of the battery 102. Thus, batteries with different forms may be used. The power line 109 is located in the top of the circuit board 103, contacting the positive electrode of the battery 102.

The battery 102 is located between the antenna board 101 and the circuit board 103. Specifically, the antenna board 101 is located so that it faces the first surface of the battery 102 (power supplying unit). The circuit board 103 is located so that it faces the second surface of the battery 102 (power supplying unit).

The top surface of the circuit board 103 is covered with a metal layer 103a except the area which surrounds the location where the signal line 104 and the power line 109 are piercing. Here, the top surface of the circuit board 103 is the surface facing the power supplying unit. It is possible to use bronze, gold, alloys of the following or the like for the material of the metal layer 103a, for example. However, it is possible to use other conductors. The metal layer 103a is contacting the negative electrode of the battery 102. Thus, the metal layer 103a is used as the ground (reference potential) of the whole wireless terminal 1. Specifically, the electrical potential of the metal layer 103a becomes the reference potential for the circuits implemented on the antenna of the antenna board 101 and the circuit board 103. As long as the metal layer 103a is electrically connected to the negative electrode of the battery 102, the metal layer 103a does not have to be directly in contact with the negative electrode of the battery 102.

The signal line 104 pierces through the circuit board 103. The signal line 104 is connected to the signal line implemented on the bottom surface of the circuit board 103 via a connector. The ground line 105 is connected to a ground connector 103b located in the top surface of the circuit board 103. The ground connector 103b is electrically connected to the metal layer 103a. The form of connection is not limited. For example, it is possible to form the ground connector 103b so that it is in contact with the metal layer 103a. It is also possible to connect the metal layer 103a and the ground connector 103b electrically by using wiring in the circuit board 103. The power line 109 pierces through the circuit board 103. The power line 109 is connected to the power line implemented in the bottom surface of the circuit board 103 via a connector.

Wireless communication units 106, 107 and a sensor 108 are implemented in the bottom surface of the circuit board 103. Here, the bottom surface of the circuit board 103 is the surface which is in the opposite side of the surface which faces the battery 102 (power supplying unit). Details on the components implemented in the bottom surface of the circuit board 103 are mentioned below.

Figure 4:
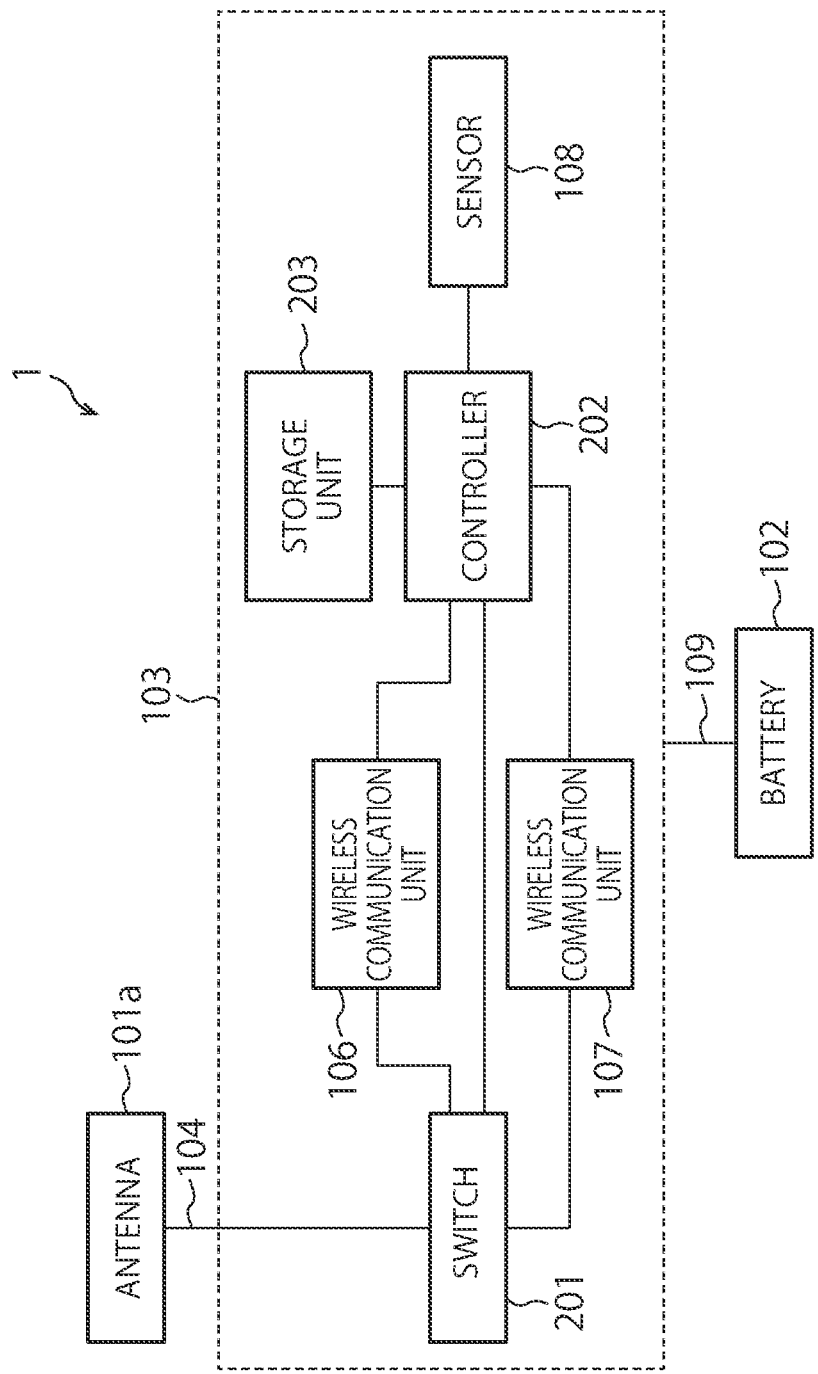
FIG. 4 is a block diagram showing components of the wireless communication device according to the first embodiment.

FIG. 4 is a block diagram showing components of the wireless communication device according to the first embodiment. Below, the wireless communication device according to the embodiment is described in reference to FIG. 4.

In FIG. 4, the antenna 101a, the battery 102 and the circuit board 103 are shown. The circuit board 103 includes a switch 201, wireless communication units 106 and 107, a controller 202, a storage unit 203 and the sensor 208. Each components in the circuit board 103 operate by using the electric power supplied from the battery 102 connected via the power line 109.

The signal line 104 coming out from the antenna 101a is connected to the switch 201. Since the antenna 101a is shared by both the wireless communication units 106 and 107, the switch 201 is shared by both the wireless communication units 106 and 107. The switch 201 switches the destination of electric connection of the signal line 104 between the wireless communication unit 106 and the wireless communication unit 107.

The wireless communication units 106 and 107 transmit and receive wireless signals via the antenna 101a. The frequency range of the wireless signals used by the wireless communication unit 106 and the frequency range of the wireless signals used by the wireless communication unit 107 could be either different or overlapping. Below, the central frequency of the frequency range of the wireless signals is called the radio frequency. For example, the wireless communication unit 106 can use 2.4 GHz as the radio frequency. The wireless communication unit 107 can use 5 GHz as the radio frequency. Below, the radio frequency used by the wireless communication unit 106 is referred to as the first frequency $f_1$. The radio frequency used by the wireless communication unit 107 is referred to as the second frequency $f_2$.

Examples of the wireless communication methods used by the wireless communication unit 106 and the wireless communication unit 107 include wireless LAN such as IEEE 802.11 series and the successor standards. Other examples include Bluetooth, Bluetooth Light Energy, ZigBee or the like but other methods may be used. However, the communication method used by the wireless communication unit 106 and the wireless communication unit 107 need to be the same or compatible to the method used by the other wireless communication device.

The wireless communication units 106 and 107 executes encoding, modulation, D/A conversion, amplification or the like during transmission of data, before sending the wireless signals using the antenna 101a. Also the wireless communication units 106 and 107 amplify the signals received from the antenna 101a by using a low-noise amplifier. Then, the wireless communication units 106 and 107 extract the desired frequency components by using band-pass filters or the like. Then the extracted signal components are converted to digital signals. Finally, the wireless communication units 106 and 107 demodulate and decode the digital signals. During the decoding process, it is possible to execute error detection processes or error corrections processes.

The wireless communication units 106 and 107 can execute frequency conversions. For example, it is possible to convert the radio frequency signals to baseband frequency signals when data is received. Also, it is possible to convert baseband frequency signals to radio frequency signals when data is being transmitted.

The aforementioned processes for transmission and reception of data are only examples. The wireless communication units 106 and 107 can use different methods. Although there are different methods for encoding data, modulating data, demodulating data, A/D conversions, D/A conversions, error detections and error corrections, any method could be used.

In the example shown in FIG. 4, two wireless communication units are shown. However, the number of wireless communicating methods could be different. For example there could be a single wireless communication unit or a plurality of wireless communication units.

The sensor 108 measures physical information in the environment where the wireless terminal 108 is located. Examples of the physical information that is measured include, velocity, rate of acceleration, pressure, oscillation, heat, light, infra-red rays, ultra-violet rays, radiation, sound waves, voltage, current, magnetism, concentration of substances, distance, number of rotations, images, inclination or the like. However, any type of information could be measured. The information which is measured could be a single type of information or multiple types of information. The sensor 108 could be a plurality of sensors.

The controller 202 executes control processes such as the timing of measurement by the sensor 108, management of measured data, configuration of the wireless communication units 106 and 107, control of the switch 201 or the like. The controller 202 manipulates the sensor 108 so that the physical information specified by the monitoring device could be measured at the specified timing. After the measurement, the controller 202 stores the measured data to the storage unit 203. The controller 202 controls the wireless communication units 106, 107 and the switch 201, to ensure that the measured data stored in the storage unit 203 is transmitted to the monitoring device 20.

For example, if the measured data is transmitted by the wireless communication device 106, the controller 202 configures the switch 201 to ensure that the wireless communication device 106 is electrically connected to the signal line 104 and the antenna 101a. Then, the controller 202 reads out the measured data from the storage unit 203. The measured data is sent to the wireless communication device 106. Then, the controller 202 instructs the wireless communication device to transmit data, specifying the destination of data. After transmission of data, the corresponding measured data could be deleted from the storage unit 203.

Also, the controller 202 can change the radio frequencies, encoding methods, modulation methods, error detection methods, error correction methods, communication methods or the like used by the wireless communication devices 106 and 107. The controller 202 can be implemented with hardware circuitry including semiconductor circuits, FPGAs, PLDs or the like. The controller 202 can be implemented with programs operating on microprocessors or a combination of the above.

The storage unit 203 provides storage space where various data such as the measured data and programs could be saved. The storage unit 203 can be configured with non-volatile storage devices such as NAND flash memory, NOR flash memory, MRAM, ReRAM, hard disks, optical discs. The storage unit 203 can be also configured with volatile storage devices such as DRAM or a combination of the above.

Figure 5:
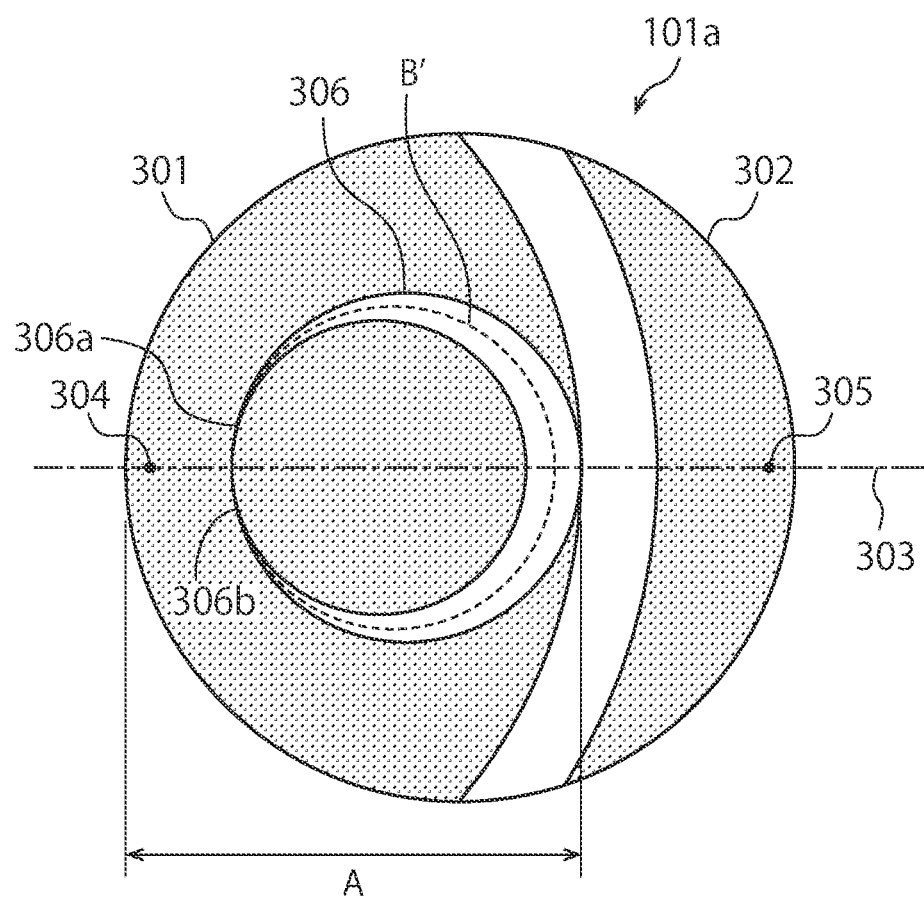
FIG. 5 is a diagram showing configuration of an antenna according to the first embodiment.

Below, details of the antenna 101a are described. FIG. 5 is a diagram showing configuration of an antenna according to the first embodiment. In the following the configuration of the antenna board and antenna according to the embodiment is described in reference to FIG. 5.

The antenna board 101 has two layers; a dielectric layer on the top and a conductive layer in the bottom. The conductive layer corresponds to the antenna 101a. FIG. 5 is a diagram showing configuration of an antenna according to the first embodiment. As shown in FIG. 5, the conductive layer forming the antenna 101a is separated into multiple elements. The dielectric layer fixes the relative locations of the multiple elements in the conductive layer.

The antenna 101a includes planar elements 301 and 302 formed from a conductor. Examples of conductors include various metals. However, any conductive substance could be used. Since line 303 is the axis of symmetry for the antenna 101a, the shapes of the planer elements 301, 302 are symmetric with respect to the line 303. The planar element 301 is connected to the signal line 104 at a connecting point 304 (first point) located on the line 303. The planar element 302 is connected to the ground line 105 at a connecting point 305 (second point) located on the line 303.

The length of the planer element 301 along the line 303 equals to approximately ¼ of the wavelength for the first frequency $\lambda_1=c/f_1$. Here, c is the speed of light.

If the body of the wireless terminal needs to be designed compactly, it would become difficult to maintain a large distance between the planar element 301 and other parts. If components are located adjacently, it becomes difficult to ignore the parasitic capacitance between the planar element 301 and other components. Here the other components include the metal layer 103a of the circuit board 103 and the positive electrode of the battery 102. If the parasitic capacitance becomes large, the planar element 301 becomes capacitive, shifting resonance frequencies.

As a solution, a separate planar element 302 is located adjacently to the planar element 301. The planar element 301 which is coupled with the planar element 302, forming some capacitance components. The planar element 302 is connected the metal layer 103a of the circuit board 103 via the ground line 105. Since the planar element 302 also has some inductance, the aforementioned structure causes the insertion of inductance elements between the planar element 301 and the metal layer 103a in a series connection. By using a combination of the planer elements 301 and 302, it is possible to reduce to capacitive nature of the circuit, stabilizing the response of the antenna 101a.

In the wireless communication device according to the embodiment, the positive electrode of the battery 102 is located between the antenna 101a (the planar element 301 and 302) and the electronic components located in the bottom surface of the circuit board 103. The positive electrode of the battery 102 acts as a shield between the antenna 101a and the electronic components located in the bottom surface of the circuit board 103, preventing electromagnetic coupling. Then, the response of the antenna 101a would not depend on the layout of the electronic components in the bottom surface of the circuit board 103 and the combination of electronic components such as sensors. Thereby, the tough labor of redesigning the whole antenna 101a is no longer needed.

In the planar element 301, there is a slot 306 which is a crescentic opening. The length of the arc-shaped line which is drawn along the center of the slot 306 between the positions 306a and 306b in the width direction is the length B' of the slot 306. The length B' of the slot 306 is equal to approximately ½ of the wavelength for the second frequency $\lambda_2=c/f_2$. Here, c is the speed of light. If a signal with the second frequency is applied from the connecting point 304, a current is distributed along the outer periphery of the slot 306. The amplitude of the current becomes the greatest at the edges 306a and 306b of the slot. The shapes of the edges 306a and 306b are formed so that they are heading to the direction of the connecting point 304, from the slot 306. A current flows between the connecting point 304 and the outer periphery of the slot 306 via the planar element 301, resonating at the second frequency $f_2$ at a value different from the first frequency.

The shape of the slot 306 is symmetric in respect to the line 303 which is the axis of symmetry. The connecting point 304 is located along the line 303. Thus, it is easy to have an electric current flow between the connecting point 304 and the slot 306 via the edges 306a and 306b of the slot.

As mentioned above, it is possible to create a multi-resonant antenna without increasing the total area of the antenna, if slots are formed within the planar antenna. The antenna explained above is only an example. Therefore, it is possible to use antennas with a different configuration. For example, it is possible to use a planar antenna with a different shape from above. It is also possible to use an antenna board with conductive layer on the top and the dielectric layer in the bottom.

Figure 6:
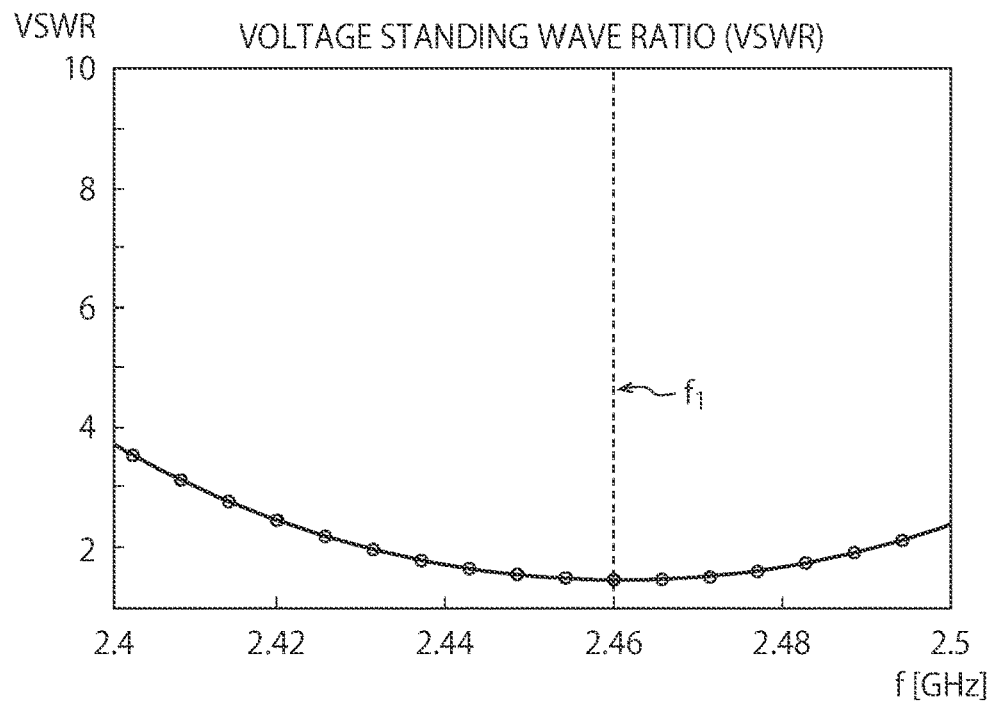
FIG. 6 is a diagram showing frequency characteristics of the antenna in the vicinity of a first frequency.
Figure 7:
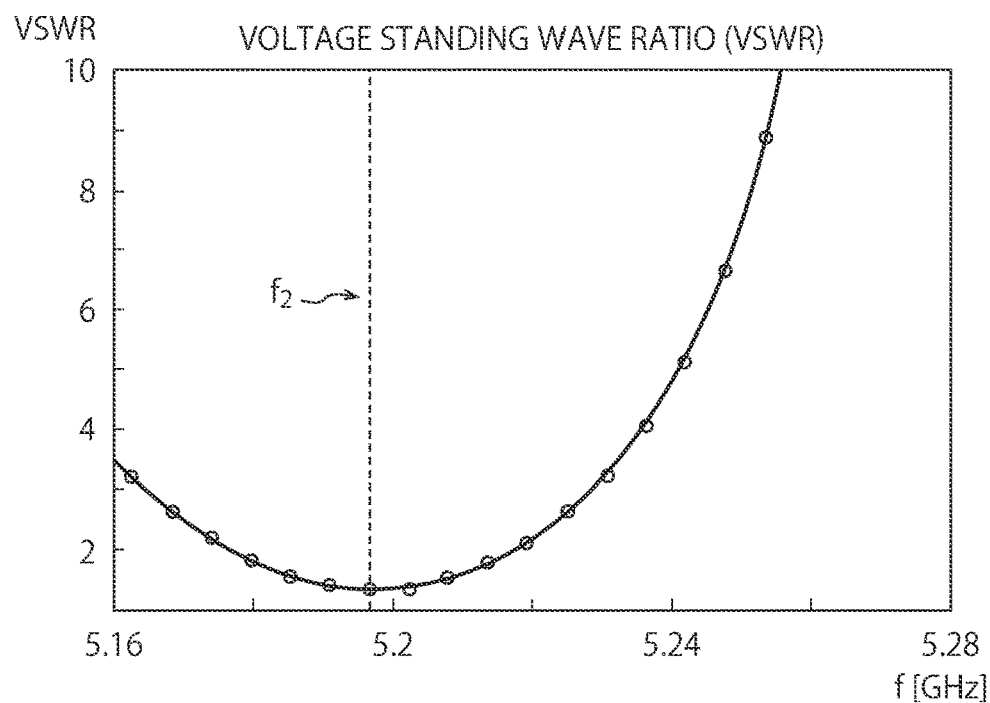
FIG. 7 is a diagram showing frequency characteristics of the antenna in the vicinity of a second frequency.

FIG. 6 and FIG. 7 are graphs which show the frequency characteristics of the antenna 101a. In both graphs, the vertical axes are the VSWR (Voltage Standing Wave Ratio) and the horizontal axes are the frequency in units of GHz. The VSWR is defined according to the following equation (1).

$$VSWR = \frac{1+|\rho|}{1-|\rho|} \tag{1}$$

The $\rho$ in equation (1) could be defined according to equation (2).

$$\rho = \frac{Z-Z_0}{Z+Z_0} = \frac{V_2}{V_1} \tag{2}$$

Here, Z is the load impedance and $Z_0$ is the characteristic impedance. $V_2$ is the amplitude of voltage in reflected waves. The closer the value of r is to 0, the smaller the impedance mismatch and reflection loss becomes. Therefore, closer the VCWR is to 1, the smaller the reflection loss becomes. In general, a condition where the reflection loss is at the minimum is the optimum condition.

Referring to FIG. 6, the VSWR takes a minimum value which is approximately 1.5, in the first frequency $f_1=2.46$ GHz. However, referring to FIG. 7, the VSWR is also takes a minimum value which is approximately 1.5, in the second frequency $f_2=5.195$ GHz. Therefore, the antenna 101a resonates at the first frequency $f_1$ and the second frequency $f_2$. Therefore, the antenna 101a resonates at the first frequency $f_1$ and the second frequency $f_2$.

The antenna shown in FIG. 5 has two resonant frequencies. However, an antenna with different number of resonant frequencies could be used. For example, an antenna with only a single resonance frequency could be used. Also, an antenna with a plurality of resonant frequencies could be used.

The wireless communication unit 106 communicates using frequency ranges which include the first frequency $f_1$ which is the resonance frequency of the antenna 101a. The wireless communication unit 107 communicates using frequency ranges which include the second frequency $f_2$ which is the other resonance frequency of the antenna 101a. If the number of wireless communication units implemented in the wireless communication device is different from the example shown in FIG. 4, a similar relationship holds. Each wireless communication unit could communicate using frequency ranges including either of the resonant frequencies of the antenna.

(First Variation)

In the explanation of the first embodiment, the method of attaching the antenna board, the battery and the circuit board together to form a body was not mentioned. In the first variation, the body is formed by fitting the boards together. In the following, the difference between the wireless communication device according to the first variation and the wireless communication device according to first embodiment is mainly explained.

Figure 8:
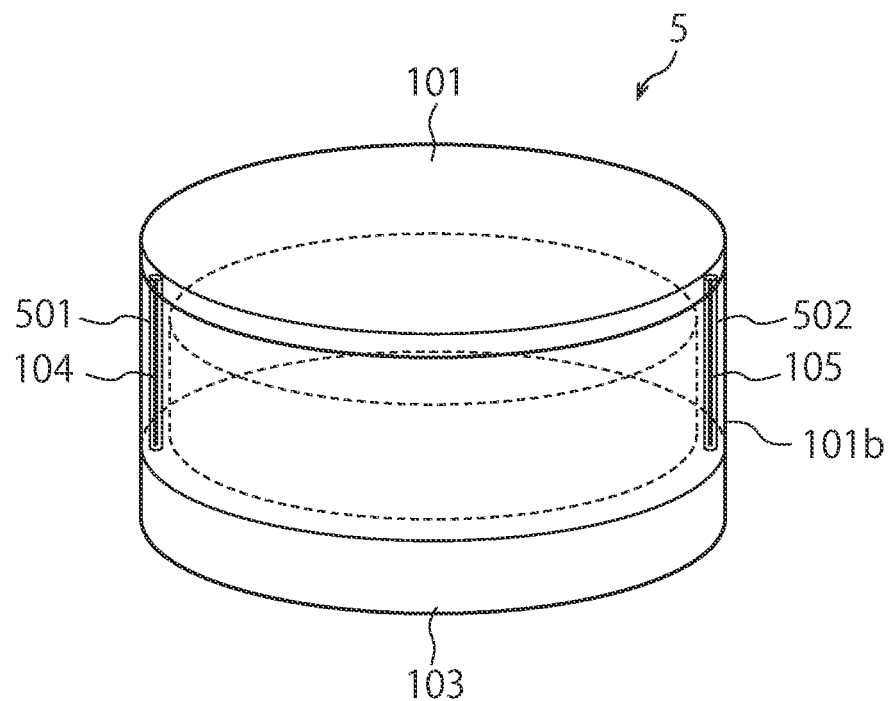
FIG. 8 is a diagram showing a perspective view of a wireless communication device according to a first variation.

FIG. 8 shows a perspective view of a wireless terminal 5. Here, the wireless terminal 5 is a wireless communication device according to the first variation. The antenna board 101 of the wireless terminal 5 has a side wall 101b which covers the battery 102 from the side. The side wall 101b is a wall structure formed along the edge of the antenna board. The overall structure including the antenna board 101 and the side wall 101b forms a shape similar to a lid which covers the whole battery 102. By protecting the battery 102 with a lid structure, it is possible to prevent intrusion of external objects and short accidents. The side wall 101b of the antenna boards 101 is formed with insulators. Examples of insulators include polyethylene, plastic, pottery or rubber but other material could be used.

As shown in FIG. 8, connectors 501 and 502 are located in the interior of the side wall 101b. The edges of the connectors 501 and 502 are formed with insulators. The top of the connector 501 is formed from conductive substance and is connected electrically to the planar element 301 via the connecting point 304. The top of the connector 502 is also formed from conductive substance and is connected electrically to the planar element 302 via the connecting point 305.

Figure 9:
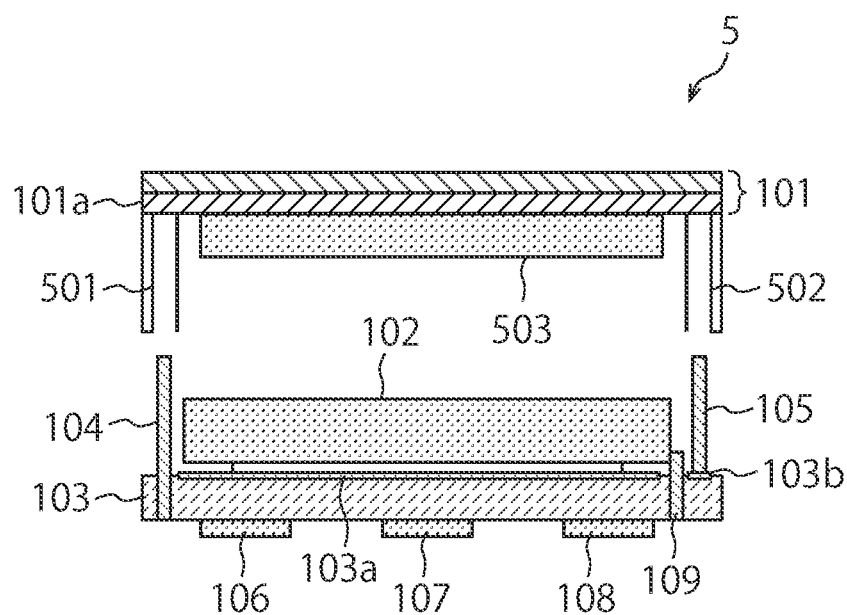
FIG. 9 is a diagram showing the wireless communication device according to the first variation in detached state.
Figure 10:
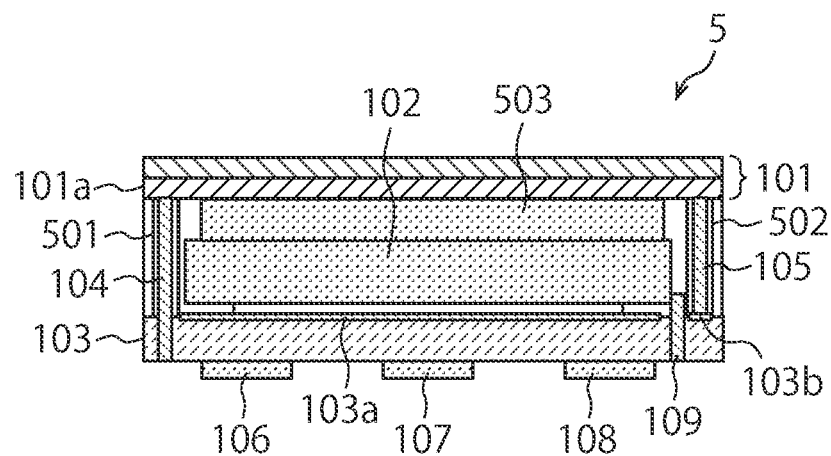
FIG. 10 is a diagram showing the wireless communication device according to the first variation in attached state.

FIG. 9 shows the wireless terminal 5 before attachment. FIG. 10 shows the wireless terminal 5 after attachment. Both FIG. 9 and FIG. 10 are cross-sectional diagrams of the wireless terminal 5. As shown in the examples of FIG. 9 and FIG. 10, the antenna board 101 is attached by inserting the antenna board 101 to the circuit board 103 with the battery 102 placed on the top.

When the antenna board 101 is attached, the top of the signal line 104, which is projecting towards the top direction from the circuit board 103 would be contacting the top of the connector 501 in the antenna board 101. Similarly, the top of the ground line 105 would be contacting the top of the connector 502 in the antenna board 101. Thus, the signal line 104 would be electrically connected to the connecting point 304. Similarly, the ground line 105 would be electrically connected to the connecting point 305.

Therefore, when the antenna board 101 is in attached state, the electrical connection of the wireless communication device according to the first variation (wireless terminal 5) would be the same as that of the wireless communication device according to the first embodiment (wireless terminal 1).

In the bottom of the antenna board 101, a spacer 503 formed from insulators is placed. The spacer 503 is made from materials such as urethane foam, resin, rubber or the like, for example. When the antenna board 101 is in attached state, the location of the battery 102 is fixed by the downward force applied from the spacer 503. Due to the presence of the spacer 503, the impact from external shocks and movements are reduced, preventing displacement of the battery 102. Thereby, regardless of shocks or movements it is possible to retain the powered state of the circuit board 103 via the power line 109.

By combining the antenna, the battery, the sensor and the wireless communication circuit together in a small body as described in the first variation, it is possible to manufacture a wireless communication device with high communication quality in various radio frequencies. Since the section between the antenna and the wireless communication circuit (or the sensor) is shielded by the battery, there is great flexibility in allocation of components and design changes.

Second Embodiment

In a second embodiment, another method for forming the body of the wireless communication device by combining the wireless board, the battery and the circuit board is explained. For the sake of improving serviceability, it is possible to make the boards of the wireless communication device detachable. Below, a wireless communication device according to the second embodiment (wireless terminal 6) is described, mainly focusing on the difference from the wireless communication device according to the first embodiment.

Figure 11:
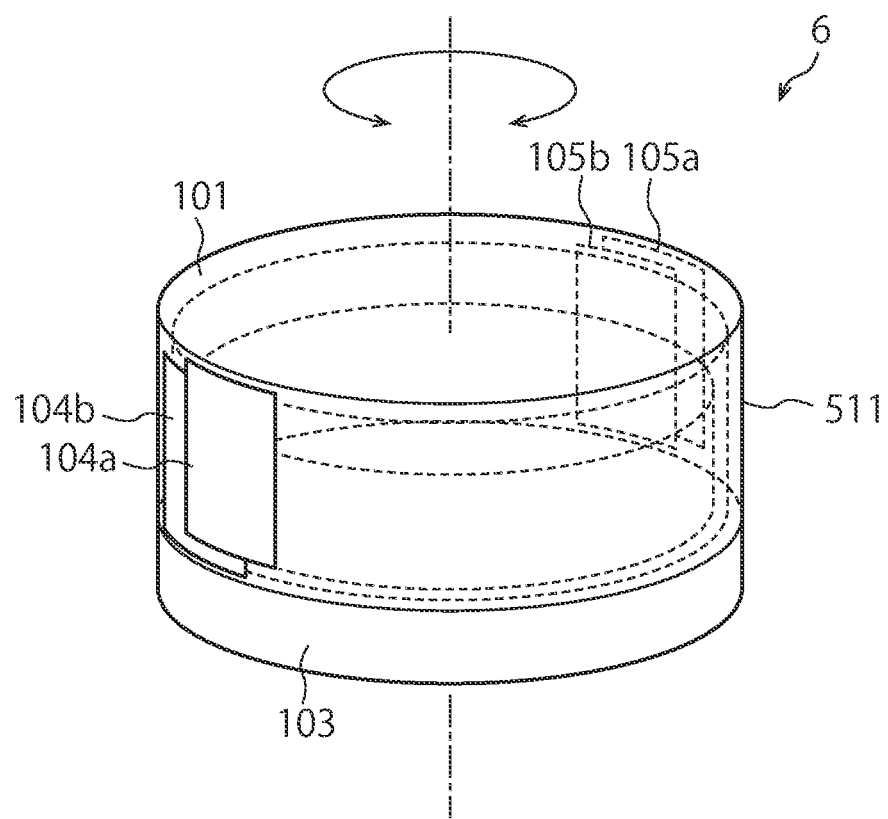
FIG. 11 is a diagram showing a perspective view of a wireless communication device according to a second embodiment.

FIG. 11 is a diagram showing a perspective view of a wireless terminal 6. Here, the wireless terminal 6 is a wireless communication device according to the second embodiment. The antenna board 101 of the second embodiment also has a side wall 511. The overall structure including the antenna board 101 and the side wall 511 forms a shape similar to a lid which covers the whole battery 102. By protecting the battery 102 with a lid structure, it is possible to prevent intrusion of external objects and short accidents. The side wall 511 of the antenna boards 101 is formed with insulators. Examples of insulators include polyethylene, plastic, pottery or rubber but other material could be used.

Figure 12:
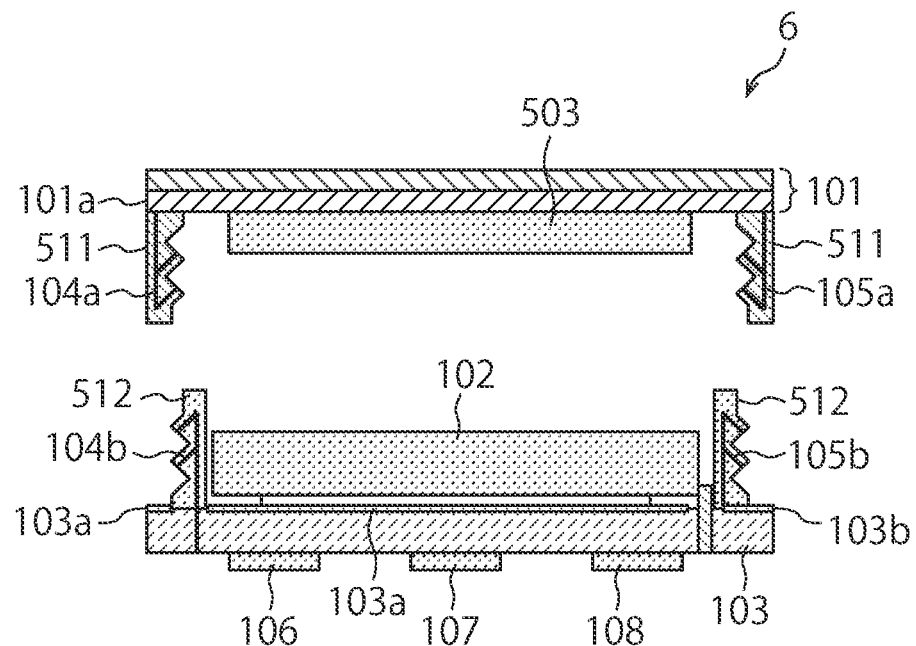
FIG. 12 is a diagram showing the wireless communication device according to the second embodiment in detached state.
Figure 13:
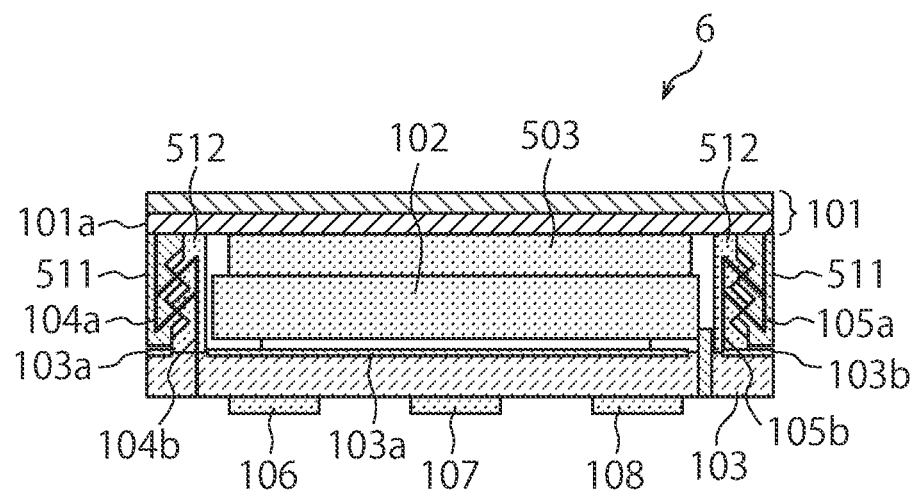
FIG. 13 is a cross-sectional diagram of the wireless communication device according to the second embodiment.

FIG. 12 is a diagram showing the wireless terminal 6 before attachment. FIG. 13 is a diagram showing the wireless terminal 6 after attachment. Both FIG. 12 and FIG. 13 are cross-sectional diagrams of the wireless terminal 6.

The procedure to attach the antenna board 101 to the circuit board 103 is similar to the procedure for attaching a screw cap to a container. Thus, the antenna board 101 is attached to the circuit board 102 by rotating the antenna board 101 in clockwise direction. Also, the procedure for detaching the antenna board 101 from the circuit board 103 is similar to the procedure for detaching a screw cap from a container. To remove the antenna board 101 from the circuit board 103, the antenna board 101 is rotated in counterclockwise direction.

Therefore, in the second embodiment, the antenna board 101 including the side wall 511 corresponds to the screw cap. The circuit board 103 corresponds to the container storing the battery 102. Here, attachment according to the right-handed screw method was described. However it is possible to do attachment according to the left-handed screw method as well.

For the sake of the aforementioned attachment and detachment, a screw structure including ridges and grooves (second screw structure) is formed in the interior of the side wall 511 of the antenna board 101. Also, a screw structure including ridges and groove (first screw structure) is formed in the exterior of an opening part 512 of the antenna board 101. As illustrated in FIG. 13, when the antenna board 101 is attached to the circuit board 103, the screw structures would be contacting with each other. The screw structure shown in FIG. 12 and FIG. 13 are only examples. Thus, different screw structures can be used instead. For example, the direction of the threads, threads per inch, the shapes of the ridges, the shapes of the grooves or the ridges could be modified. However, the screw structure in the interior of the side wall 511 and the screw structure in the exterior of the opening part 512 need to be consistent.

In the second embodiment, metal plates 104a and 104b are used instead of the signal line 104. Metal plates 105a and 105b are used instead of the ground line 105. The metal plates 104a and 105a are implanted in the side wall 511. The metal plates 104b and 106b are implanted in the opening part 512. The metal plates 104a, 104b, 105a, 105 b are formed with metal such as copper, cold, alloys or the like, for example. As long as the material which is used is conductive, any material could be used to form the metal plates.

The top of the metal plate 104a is electrically connected to the planar element 301 (the antenna 101a) via the connecting point 304. The bottom of the metal plate 104b is electrically connected to the switch 201 in the bottom of the circuit board 103. The top of the metal plate 105a is electrically connected to the planar element 302 (antenna 101a) via the connecting point 305. The bottom of the metal plate 105b is electrically connected to the metal layer 103a on the top of the circuit board 103.

As shown in FIG. 12, parts of the metal plate 104a and 105a are exposed to the outside in parts of the screw structure which is formed in the interior of the side wall 511 of the antenna board 101. Also, parts of the metal plate 104b and 105b are exposed to the outside in parts of the screw structure which is formed in the exterior of the opening part 612 of the circuit board 103.

FIG. 11 and FIG. 13 show the states when the metal plates are in contact with each other. If the antenna board 101 is attached to the circuit board 103, the metal plate 104a and metal plate 104b are in contact. Similarly, the metal plate 105a and metal plate 105b are in contact as well. In this state, the metal plate 104a and metal plate 104b become electrically connected, forming the same connection as the signal line 104 of the first embodiment. Also, the metal plate 105a and metal plate 105b become electrically connected, forming the same connection as the ground line 105 of the first embodiment.

The metal plate 104a in the side wall 511 is located so that when the antenna board 101 is rotated and attached to the circuit board 103, it overlaps with the location of the metal plate 104b in the opening part 512. Similarly, the metal plate 105a in the side wall 511 is located so that when the antenna board 101 is rotated and attached to the circuit board 103, it overlaps with the location of the metal plate 105b in the opening part 512.

The other features and structures of the wireless terminal 6 are similar to that of the wireless communication device according to the first embodiment.

As mentioned above, by making the antenna board 101 lid-shaped and the circuit board 103 a container which can store the battery 102, it becomes easy to assemble and disassemble the wireless terminal 6. Thus, it is possible to reduce the cost required for the production and the maintenance of the wireless terminal 6. Considering the workload required for replacing the battery 102, the use of a body of the aforementioned structure has many advantages.

Third Embodiment

In the second embodiment, the serviceability of the wireless communication device was improved by using a structure which enables easy assembling and disassembling of the body. After the allocation of the wireless communication devices, the disassembling of the body becomes necessary when the replacements of batteries are required. Thus, by using secondary batteries, it is possible to reduce the frequency of battery replacement tasks. The secondary batteries could be charged by using wireless power supply technology.

Figure 14:
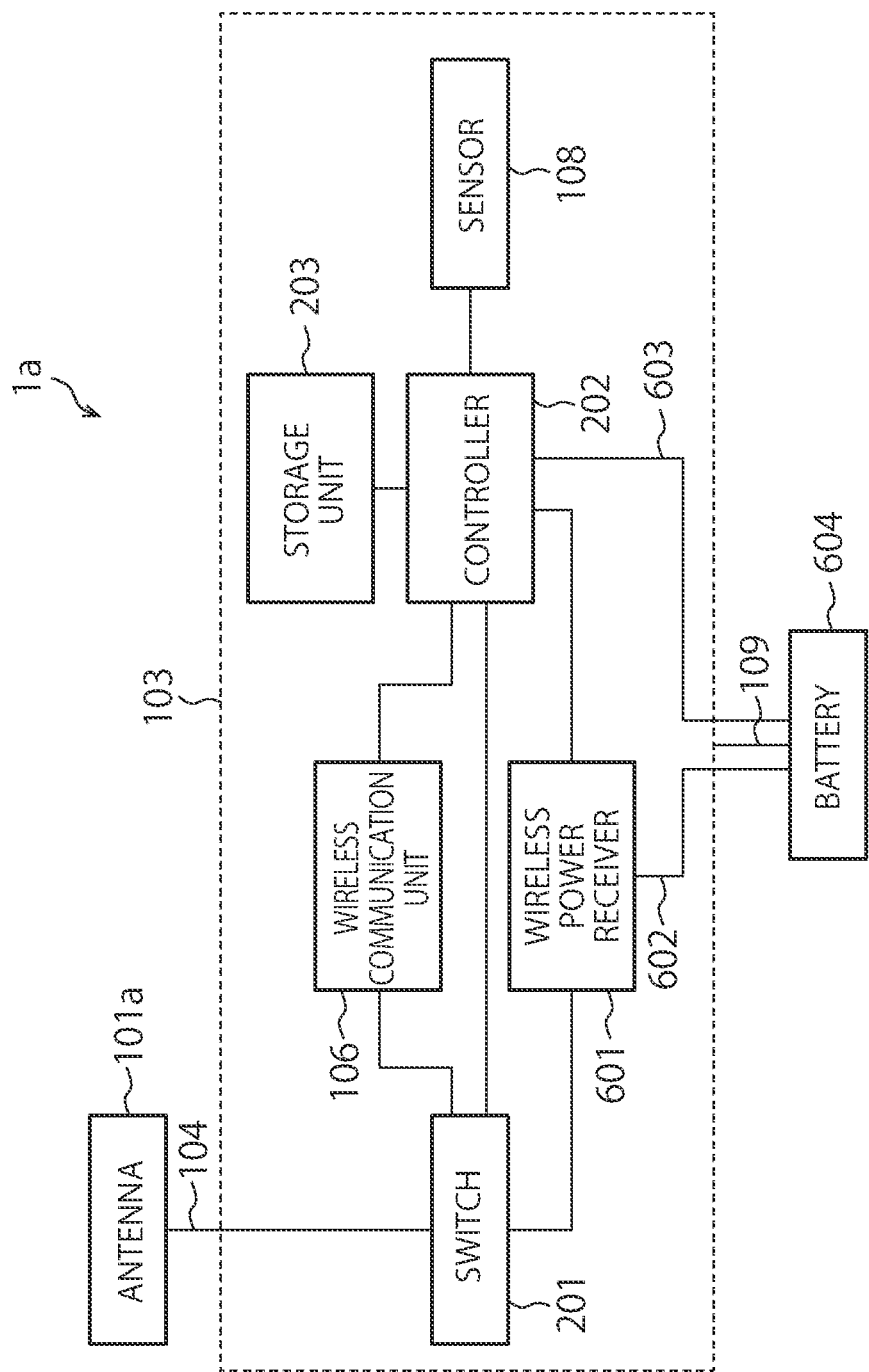
FIG. 14 is a block diagram showing components of a wireless communication device according to a third embodiment.

FIG. 14 is a block diagram showing components of a wireless terminal 1a. Here, the wireless terminal 1a is a wireless communication device according to the third embodiment. Below, referring to FIG. 14, mainly the differences between the aforementioned embodiments are explained.

The wireless terminal 1a includes a wireless power receiver 601 instead of the wireless communication unit 107. The wireless power receiver 601 receives wireless signals transmitted from external wireless communication devices such as the monitoring device 20. The wireless power receiver 601 also converts the wireless signals to direct currents. The converted direct current is supplied to the battery 603 via the signal line 602.

The wireless power receiver 601 could be a combination of a receiver circuit which receives wireless signals as analog signals and a rectifier circuit, for example. Also, a combination of a transceiver circuit which is capable of transmitting or receiving wireless signals and a rectifier circuit could be used as well. Any type of implementation can be used as the wireless power receiver 601. If the later implementation is used, the configuration of the wireless power receiver 601 would be similar to a combination of the wireless communication unit 107 and a rectifier circuit.

The wireless terminal 1a has a battery 604 instead of a battery 102. The battery 604 is a chargeable secondary battery. The battery 604 is another example of the electric storage unit. Examples of the battery 604 include, lithium-ion batteries, nickel-metal hydride batteries, nickel cadmium batteries. However, other types of secondary battery may be used.

The battery 604 supplies electric power to each of the electric components in the circuit board 103, from the power line 109 which is in contact with the positive electrode. Also, the battery 604 is also electrically connected to the wireless power receiver 601 via a signal line 602. The battery 604 is charged by direct current from the wireless power receiver 601. The battery 604 is electrically connected to the controller 202 via a control line 603.

The controller 202 according to the third embodiment executes processes related to the charging of the battery 604, in additions to tasks described in the first embodiment. Below, the process related to the charging of battery 604 is explained.

The controller 202 obtains information on the battery 604 periodically from the control line 603, confirming the remaining power of the battery 604. The remaining power of the battery could be measured based on the output voltage of the battery. It is also possible to measure the remaining power by calculating the integral value of the current flowing in and out of the battery. Thus, any method of measurement could be used. The cycle of confirming the remaining power could be once in 12 hours or once in 24 hours, for example. However, different cycles could be used.

When the controller 202 confirms that the remaining power of battery 604 is lower than the first threshold value, the measurement of data in the sensor 108 and the transmission of measured data in the wireless communication unit 106 are stopped. By executing such control processes, the consumption of electric power is reduced. For the first threshold value, 20% of the maximum capacity of the battery 604 could be used. However, the first threshold value could take a different value.

Then, the controller 202 requests the external wireless communication device to send power charging signals from the wireless communication unit 106. Examples of external wireless communication devices include the monitoring device 20. However, other devices can be used.

The controller 202 waits until the response corresponding to the aforementioned request is received. If the controller 202 confirms that the response from the external wireless communication device for starting the transmission of power charging signal is received, a switch 201 is manipulated, making the wireless power receiver 601 electrically connected to the antenna 101a and the signal line 104. The power charging signals transmitted from an external wireless communication device is transformed to direct current. The direct current is used for charging the battery 604 via the signal line 602.

The controller 202 confirms the remaining power of the battery 604 periodically during the charging process. When the amount of charge for the battery 604 reaches a second threshold, the controller 202 stops charging the battery 604. For the second threshold, 85% of the maximum capacity of the battery 604 could be used, for example. However, a different value may be used.

Specifically, the controller 202 manipulates the switch 201 to make the wireless communicating unit 106 electrically connected to the antenna 101a and the signal line 104. Thereby, the supply of electric power to the battery 604 stops. Then, the controller 202 sends a request for halting the power charging signal from the wireless communication unit 106 to the external wireless communication device.

The controller 202 waits until the response corresponding to the request for halting the power charging signal is received by the wireless communication unit 106. Then, when the controller 202 confirms that the response from the external wireless communication device is received, it resumes the measurement of data by the sensor 108 and the process of transmitting measured data.

By executing the aforementioned processes, it is possible to charge the battery when the remaining power of the battery becomes low, thereby reducing the frequency of replacing batteries. The replacement of battery could be performed when the controller 202, notifies the external wireless communication device that it detected degraded cells in the battery 604. Although the structure of the body for the wireless terminal 1a was not mentioned in the description of the embodiment, the body according to any of the aforementioned embodiments or variations could be used.

Fourth Embodiment

The wireless communication device according to the third embodiment can charge the battery by using wireless power supply.

However, when the wireless power supply process was executed, the process of data measurement and transmission of the measured data was stopped. In systems where monitoring of the target needs to be continued uninterruptedly, the operation of the sensors should not be stopped. In a wireless communication device according to a fourth embodiment, it is possible to execute the data measurement process by the sensors, the communication of data and the charging of the battery by wireless power supply, concurrently.

Figure 15:
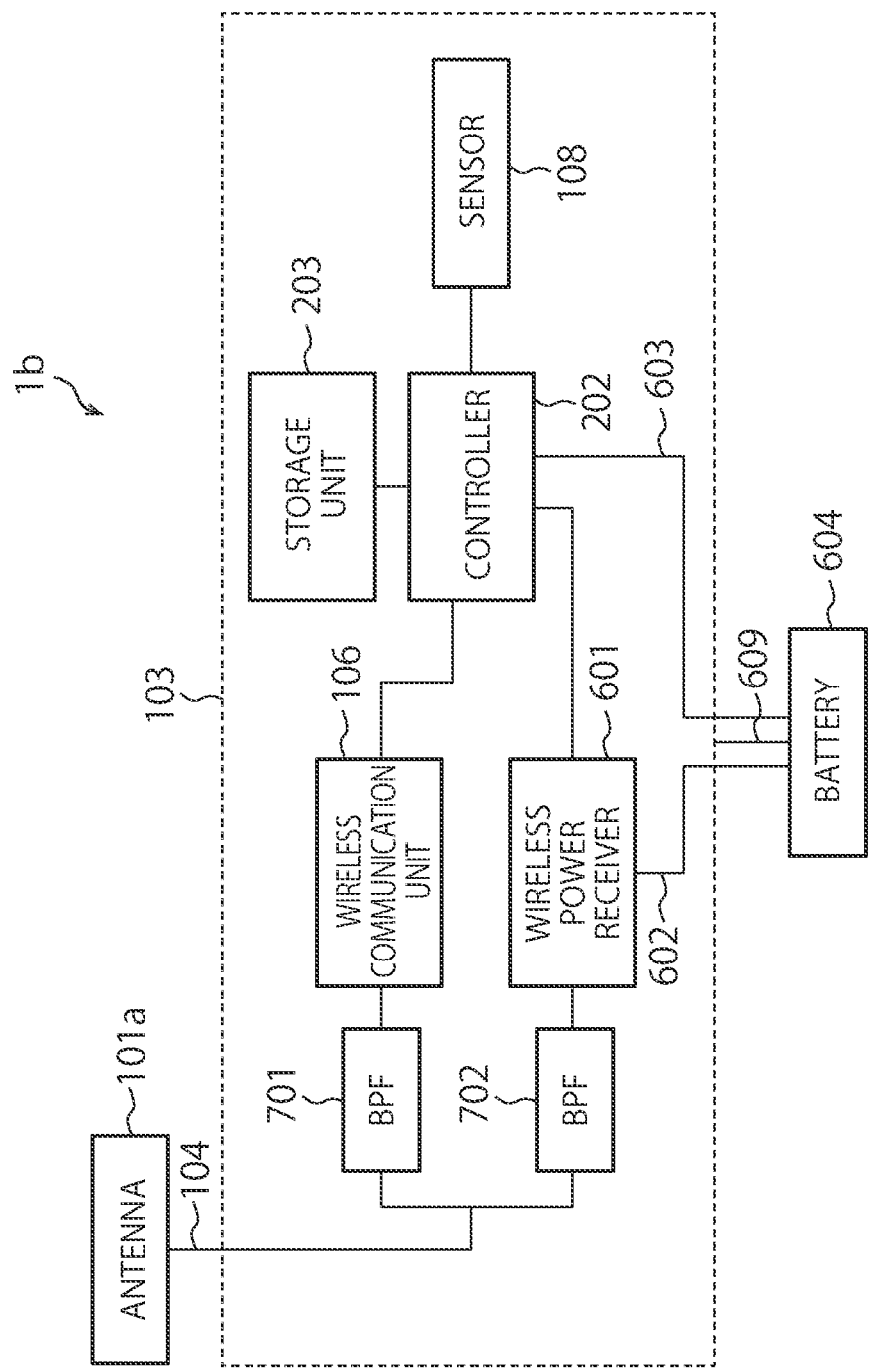
FIG. 15 is a block diagram showing components of a wireless communication device according to a fourth embodiment.

FIG. 15 is a block diagram which shows the configuration of the wireless terminal 1b. Here, the wireless terminal 1b is a wireless communication device according to the fourth embodiment. In the following, the differences between the fourth embodiment and the third embodiment are described in reference to the third embodiment.

In the wireless terminal 1b, bandpass filters 701 and 702 are implemented instead of the switch 201. Specifically, the bandpass filter 701 is placed between the antenna 101a and the wireless communication unit 106. The bandpass filter 702 is placed between the antenna 101a and the wireless power receiver 601. Therefore, signal 104 diverges into two branches. One branch is connected to the bandpass filter 701 and another branch is connected to the bandpass filter 702.

The bandpass filter 701 allows signal components in the frequency range including the radio frequency of the wireless communication unit 106 to pass through. The band pass filter 702 allows signal components in the frequency range including the frequency of the power charging signal of the wireless power receiver 601 to pass through. The frequency range filtered by the bandpass filter 701 and the frequency range filtered by the bandpass filter 702 are configured so that they do not overlap. Any type of circuit configuration can be used for the bandpass filter 701 and 702.

By placing bandpass filters, the process of manipulating the switches described in the aforementioned embodiments are no longer necessary. Thus, it is possible to send measured data from the wireless communication unit 106 while receiving power charging signals from the wireless charging receiver 601.

The configuration and features of the other components of the wireless communication device according to the embodiment is similar to the wireless communication device according to the first embodiment. The configuration of the body for the wireless terminal 1b was not explained in the description of the embodiment. However, the body according to any of the aforementioned embodiments or variations may be used.

Fifth Embodiment

In the second embodiment, a body with a detachable antenna board and a circuit board was described. However, other components can be detachable from the body. In the wireless communication device according to a fifth embodiment, the sensor could be made detachable from the main body.

Figure 16:
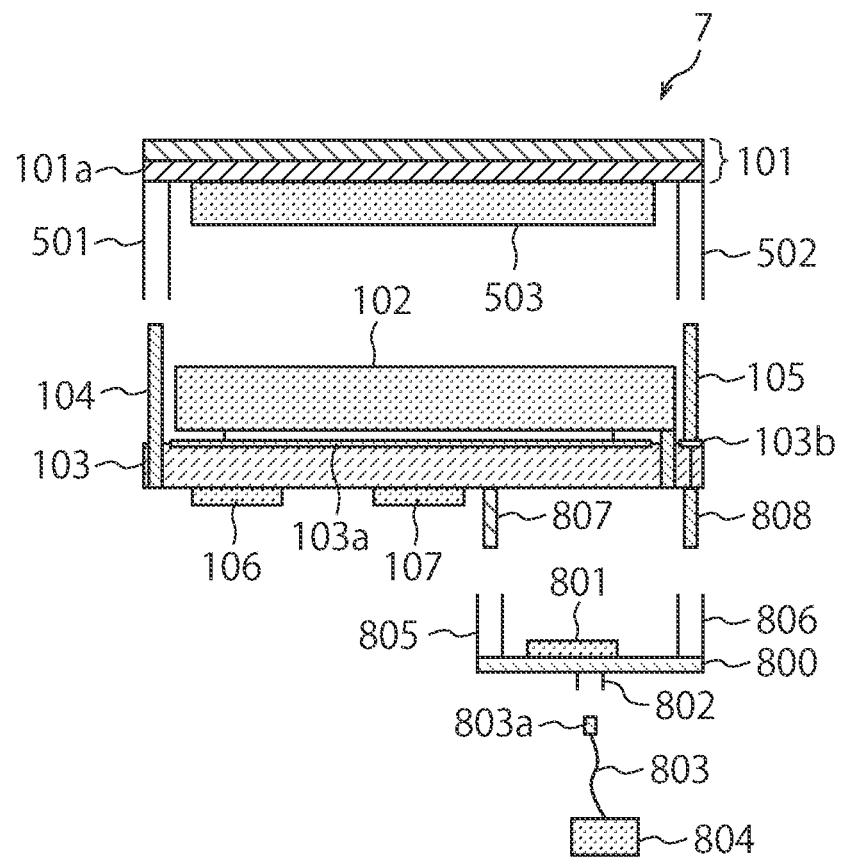
FIG. 16 is a diagram showing a wireless communication device according to a fifth embodiment in detached state.
Figure 17:
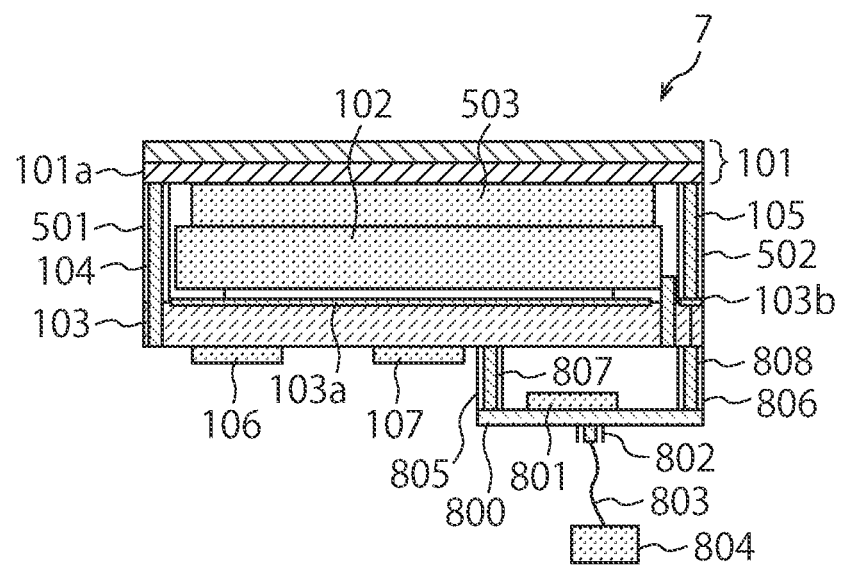
FIG. 17 is a diagram showing a wireless communication device according to a fifth embodiment in attached state.

FIG. 16 is a diagram showing a wireless terminal 7 in detached state. FIG. 17 is a diagram showing the wireless terminal 7 in attached state. Here, the wireless terminal 7 is a wireless communication device according to the fifth embodiment. FIG. 16 and FIG. 17 are both cross-sectional diagrams. In the following, the differences between the aforementioned embodiments and the fifth embodiment are described in reference to FIG. 16 and FIG. 17.

In the wireless terminal 7, the sensor includes a sensor circuit 801 and a sensor element 804. The actual measurement of physical information is done in the sensor element 804. The measured physical information is converted to electrical signals in the sensor circuit 801.

The sensor circuit 801 of the wireless terminal 7 is implemented on a circuit board 800 which is independent from the circuit board 103.

The circuit board 800 has sockets 805, 806 on the top. In the bottom of the circuit board 103, pins 807, 808 which are paired with the sockets 805, 806 are implemented. By fitting the pins 807, 808 into the sockets 805, 806 respectively, it is possible to mount the circuit board 800 to the circuit board 103.

The pin 807 is formed with a conductor. The pin 807 is electrically connected to the controller 202. The base of the socket 805 which is paired with the pin 807 is electrically connected to the sensor circuit 801. Therefore, if the circuit board 800 is attached to the circuit board 103, the sensor circuit 801 is electrically connected to the controller 202.

The pin 808 is also formed with a conductor. The pin 808 is electrically connected to the ground connector 103b and the metal layer 103a on the top of the circuit board 103. The base of the socket 806 which is paired with the pin 808 is also formed from a conductor. Therefore, when the circuit board 800 is attached to the circuit board 103, the pin 808 provides the signal reference potential for the sensor circuit 801. Examples of the aforementioned conductors include metals such as gold, copper, alloys or the like. However, any other material can be used.

The circuit board 800 has a connector 802 in the bottom. The connector 803*a* of the sensor element 804 could be attached to the connector 802. The connector 803*a* is connected to the sensor element 804 via the signal line 803.

By using the signal line 803, it is possible to place the sensor element 804 and the main body of the wireless terminal 7 in separate locations. For example, while measuring data in environments with high temperatures, high pressures, radioactive substances or corrosive substances, it is possible to send measured data from a different location by using wireless communication. Examples of the sensor element 804 include thermocouples, pressure-sensitive elements or the like. However, any type of sensor element could be used.

The features and configuration of other components of the wireless communication device according to the embodiment is similar to that of the wireless communication device according to the first embodiment. Here, the method of attaching the antenna board 101 and the circuit board 103 to form the body was not explained. However, any of the methods described in the aforementioned embodiments or variations could be used.

By using the wireless communication device according to the embodiment, it is possible to change the types of sensors that are used depending on the target of measurement or environment to be monitored, easily.

Sixth Embodiment

In the aforementioned embodiments, a battery was used as the power supplying unit. However, it is possible to use a capacitor instead of a battery as the power supplying unit. Also, it is possible to miniaturize the wireless communication device according to the embodiment, making the shape of the body the same or similar to button cell batteries. Then, it is possible to implement the wireless communication device in thin or small healthcare devices or remote controllers. It is also possible to use the wireless communication device as button cell batteries.

Figure 18:
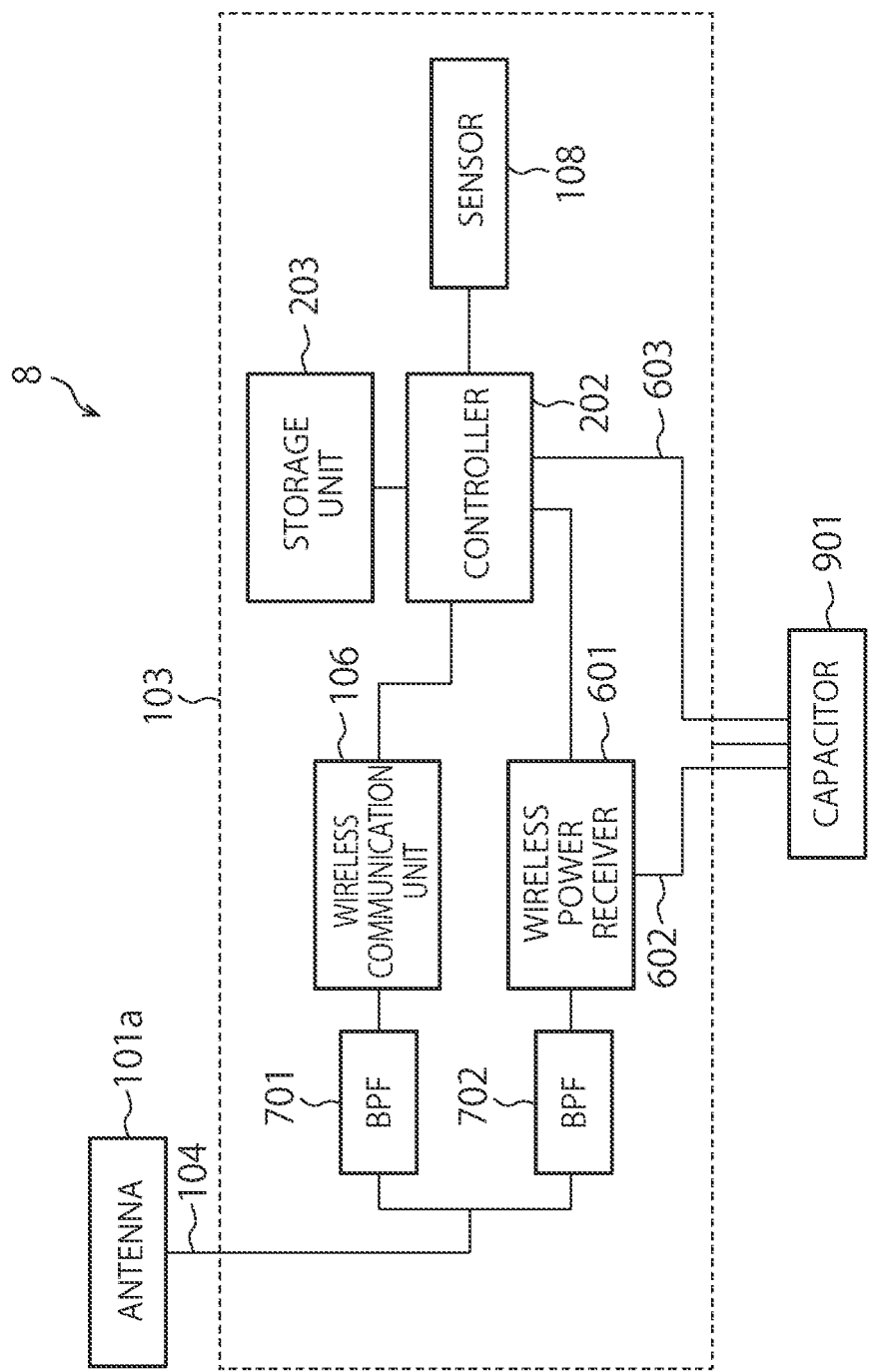
FIG. 18 is a block diagram showing components of a wireless communication device according to a sixth embodiment.

FIG. 18 is a block diagram showing components of a wireless terminal 8. Here, the wireless terminal 8 is a wireless communication device according to a sixth embodiment. Except the fact that the battery 604 (secondary battery) is replaced with a capacitor 901, the configuration of the wireless communication device is similar to that of the wireless communication device according to the fourth embodiment (wireless terminal 1*b* shown in FIG. 15).

Figure 19:
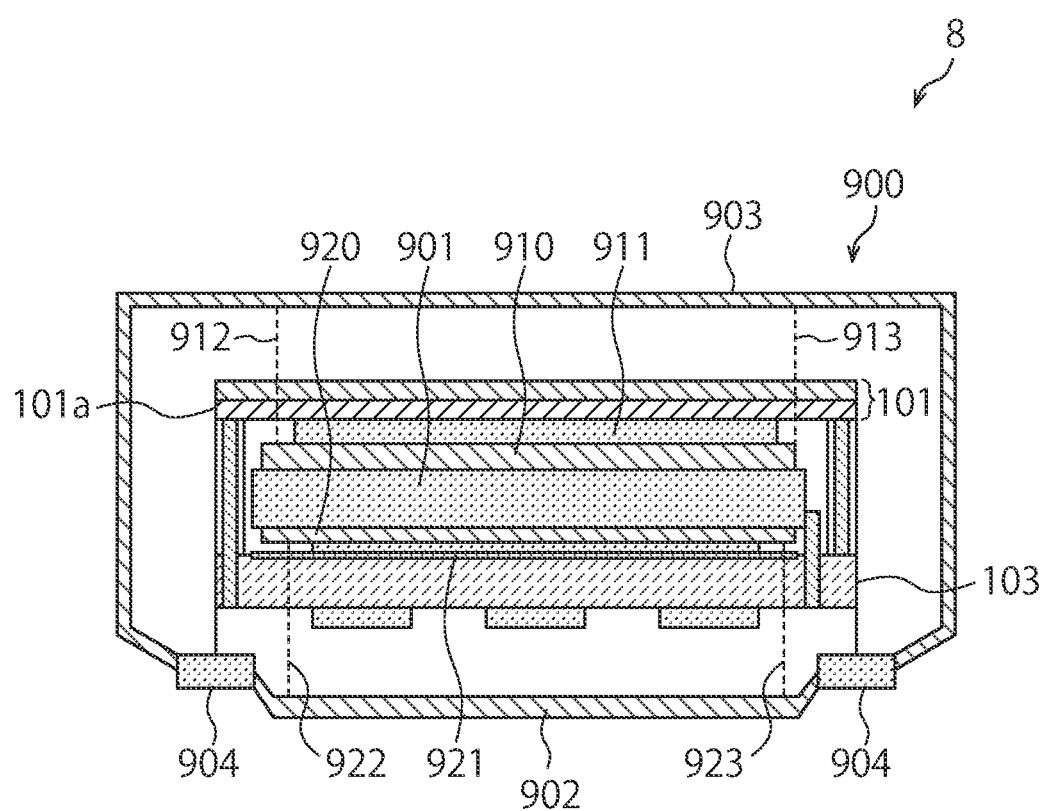
FIG. 19 is a cross-sectional diagram of the wireless communication device according to the sixth embodiment.

FIG. 19 is a cross-sectional diagram of the wireless communication device according to the sixth embodiment. Below, the configuration of the wireless terminal 8 is explained in reference to FIG. 19.

Different from the aforementioned embodiments, the antenna board 101, the capacitor 901 and the circuit board 103 of the wireless terminal 8 are all stored within the case 900. The size and the shape of the case 900 is the same as a button cell battery. The case 900 is formed with a combination of a top part 903, a bottom part 902 and an insulating part 904. The top part 903 corresponds to the positive electrode (plus side) of the button cell battery. The bottom part 902 corresponds to the negative electrode (minus side) of the button cell battery. The insulating part 904 insulates the positive electrode and negative electrode. The insulating part 904 can be formed with insulators such as rubber, resin or the like. But other material can be used. The top part 903 is connected to the bottom part 902 via the insulating part 904. The top part 903 and the bottom part 902 are formed with conductors such as metal. However, the type of conductor which is used is not limited.

Thus, the top part 903, the bottom part 902 and the insulating part 904 are combined to form a housing which stores the wireless communication device. The top surface of the top part 903 which is the third surface faces the top surface (first surface) of the power supplying unit. The top surface (third surface) of the top part 903 is formed from conductors. The bottom surface of the bottom part 902 which is the fourth surface faces the bottom surface (second surface) of the power supplying unit. The bottom surface of the bottom part 902 (fourth surface) is also formed from conductors.

The capacitor 901 is located between the antenna board 101 and the circuit board 103. An electrode 910 which is formed from conductors is located on the top surface of the capacitor 901. Similarly, an electrode 920 which is formed from conductors is located on the bottom surface of the capacitor 901. Between the electrode 910 and the antenna board 101 a spacer 911 formed from insulators are located. Similarly, between the electrode 920 and the circuit board 103, a spacer 921 formed from insulators are located. The types of insulators that are used are not limited.

A first terminal of the capacitor 901 is in contact with the electrode 910. Therefore, the electrode 910 is electrically connected to the first terminal of the capacitor 901. Similarly, the second terminal of the capacitor 901 is electrically connected to the electrode 920. The electrode 910 is electrically connected to the top part 903 via power lines 912 and 913. Similarly, the electrode 920 is connected to the bottom part 902 via power lines 922 and 923. Therefore, the terminals of the power supplying part are electrically connected to the third surface and the fourth surface, respectively. The power lines 912 and 913 are wired so that they are not in contact with the planar elements 301 and 302 of the antenna 101*a*. The power lines 922 and 923 are located so that they are not in contact with electric components and other wires in the bottom of the circuit board 103.

The features and configurations of other components of the wireless communication device according to the embodiment (wireless terminal 8) are similar to that of the wireless communication device according to the fourth embodiment. In the above description, a case when a capacitor is used for the power supplying unit was explained. However, to make the wireless communication circuit operable before the charging of the capacitor, a power supplying unit with a combination of a capacitor and a small battery could be used. Also, to enable propagation of radio waves emitted from the antenna 101*a* to the exterior of the case 900, it is possible to make openings in the top surface or side surface of the top part 903. It is also possible to form windows made from insulators. The number of openings or windows could be either one or more than one.

By using the wireless communication device with configuration according to the aforementioned embodiments, it is possible to have high serviceability while keeping the body size small. Also, by using the aforementioned wireless communication devices, wireless communication using a plurality of radio frequencies is available with high communication qualities. By using bodies that could be easily assembled and disassembled, or using wireless power supply, it is possible to reduce the manufacturing costs and maintenance costs. If various types of sensors are implemented in the wireless communication device, it is possible to measure physical information in different fields including healthcare, home appliances, industry, automotive or the like. Thus, the wireless communication device according to the embodiment of the invention could be used as a key-device for IoT (Internet of Things).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device comprising:
   a power storage unit with a second surface located oppositely to a first surface; and
   an antenna board implemented with an antenna facing the first surface; and
   a circuit board facing the second surface of the power storage unit; and
   a metal layer formed on a surface of the circuit board facing the power storage unit, connected to a terminal of the power storage unit; and
   a ground line which connects the antenna board and the metal layer; and
   a wireless communication unit implemented to the circuit board, located oppositely to a surface facing the power storage unit; and
   a signal line piercing through the circuit board, connecting the antenna board and the wireless communication unit; and
   a first planar element of the antenna shaped symmetrically in respect to an axis of symmetry; and
   a second planar element of the antenna located adjacently to the first planar element and shaped symmetrically in respect to the axis of symmetry,
   wherein the length of the first planar element respect to the axis of symmetry is approximately one-fourth of a wavelength corresponding to a first resonance of the antenna,
   the first planar element having a slot with a length approximately half of a wavelength corresponding to a second resonance frequency of the antenna,
   the first planar element connected to the signal line at a first point located on the axis of symmetry, and
   the second planar element connected to the ground line at a second point located on the axis of symmetry.

2. The wireless communication device according to claim 1, wherein
   a positive electrode of the power storage unit is located between the antenna board and the wireless communication unit.

3. The wireless communication device according to claim 1, wherein
   the antenna implemented in the antenna board has one resonance frequency or a plurality of resonance frequencies and the circuit board has a plurality of wireless communication units with each wireless communication unit using a frequency range including either of the resonant frequencies.

4. The wireless communication device according to claim 1, wherein
   the antenna is a slot antenna.

5. The wireless communication device according to claim 1, further comprising
   a side wall which is a wall formed along an edge of the antenna board, top of the side wall touching the circuit board and covering a side surface of the power storage unit.

6. The wireless communication device according to claim 5, further comprising
   an opening part which is a wall surrounding the power storage unit with a first screw structure in the exterior; and
   a screw cap including the antenna board and the side wall, with a second screw structure formed in an interior of the side wall; and
   a container including the circuit board and the opening part, and by rotating the screw cap against the container, the screw cap is attached to the container.

7. The wireless communication device according to claim 1, wherein
   the power storage unit is charged by using power supply signals received from the wireless communication unit.

8. The wireless communication device according to claim 7, further comprising
   a housing with a third surface and a fourth surface storing the wireless communication device; the third surface formed from conductors facing the first surface, the fourth surface formed from conductors facing the second surface, the terminals of the power storage unit connected to the third surface and the fourth surface, respectively.

9. The wireless communication device according to claim 8, wherein the shape of the housing is in substantially cylindrical form.

10. The wireless communication device according to claim 1, wherein the power storage unit includes a capacitor or a secondary battery.

11. The wireless communication device according to claim 1, wherein
    a sensor is implemented to the circuit board, located oppositely to the surface facing the power storage unit and the wireless communication unit transmitting data measured by the sensor.

12. The wireless communication device according to claim 1, wherein
    a connector is implemented to the circuit board, located oppositely to the surface facing the power storage unit, a sensor is detachably connected to the connector and the wireless communication unit transmitting data measured by the sensor.

13. The wireless communication device according to claim 1, further comprising:
    a ground line which connects the antenna board and a surface of the circuit board, wherein the surface of the circuit board facing the second surface of the power storage unit.

14. The wireless communication device according to claim 13, wherein
    the power storage unit is sandwiched between the signal line and the ground line.

15. The wireless communication device according to claim 14, wherein
    the signal line and the ground line are located in the vicinity of a side surface of the wireless communication device.

16. The wireless communication device according to claim 1, further comprising a power line piercing through the circuit board, connecting the power storage unit and the circuit board.

* * * * *